No. 884,446. PATENTED APR. 14, 1908.
C. H. WILLIAMS, Jr.
TRUSSED BEAM.
APPLICATION FILED NOV. 15, 1907.
2 SHEETS—SHEET 1.
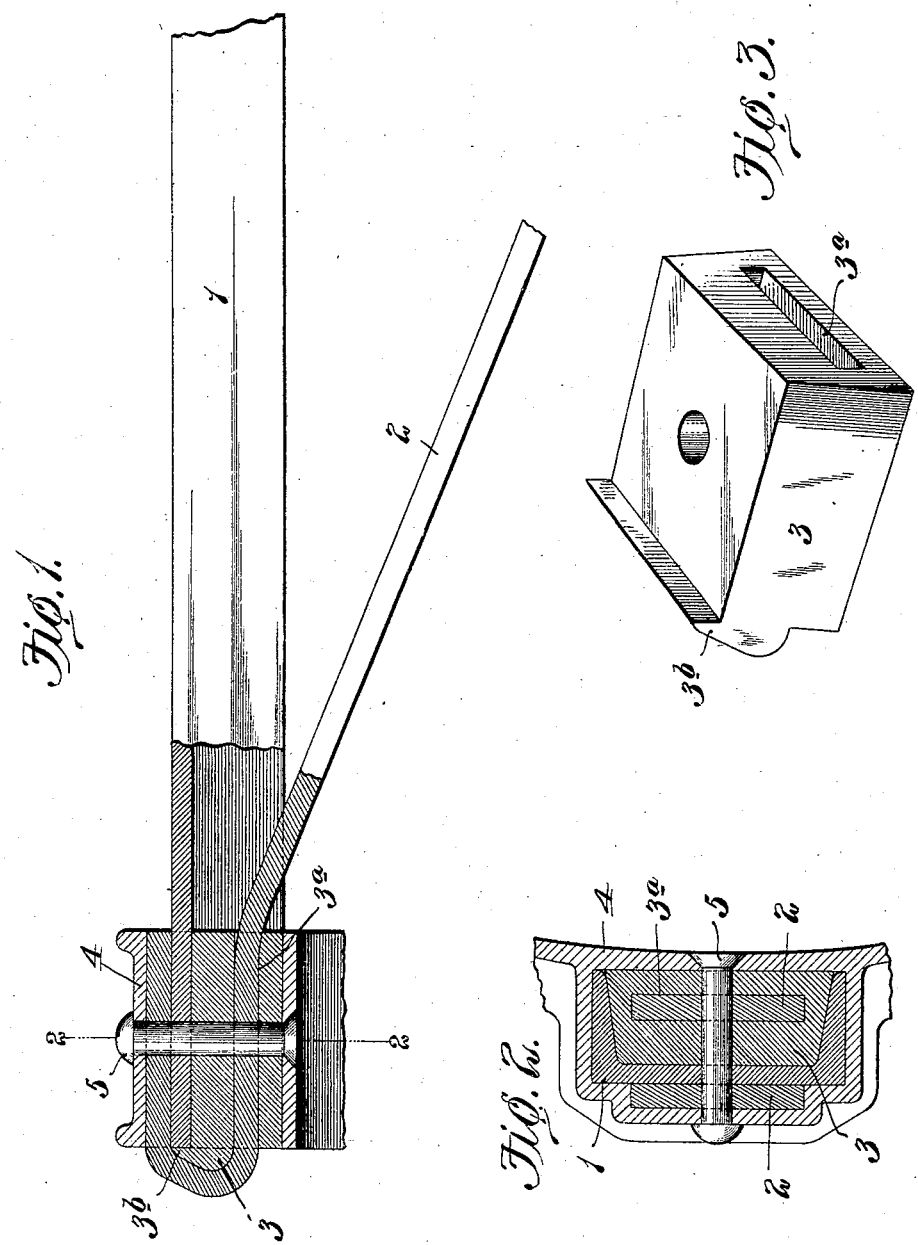
Witnesses:
Geo. R. Ladson
A. J. McCauley
Inventor,
Charles H. Williams, Jr.
By Bakewell & Cornwall Attys.

No. 884,446. PATENTED APR. 14, 1908.
C. H. WILLIAMS, Jr.
TRUSSED BEAM.
APPLICATION FILED NOV. 15, 1907.

2 SHEETS—SHEET 2.

Witnesses
Geo. R. Ladson
A. J. McCauley

Inventor.
Charles H. Williams, Jr.
By Bakewell & Cornwall Attys

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

TRUSSED BEAM.

No. 884,446.   Specification of Letters Patent.   Patented April 14, 1908.

Application filed November 15, 1907. Serial No. 402,314.

*To all whom it may concern:*

Be it known that I, CHARLES H. WILLIAMS, Jr., a citizen of the United States, residing at Chicago, Cook county, Illinois, have invented a certain new and useful Improvement in Trussed Beams, of which the following is a full, clear, and exact description, such as will enable others skilled in the art to which it appertains to make and use the same, reference being had to the accompanying drawings forming part of this specification, in which—

Figure 4:
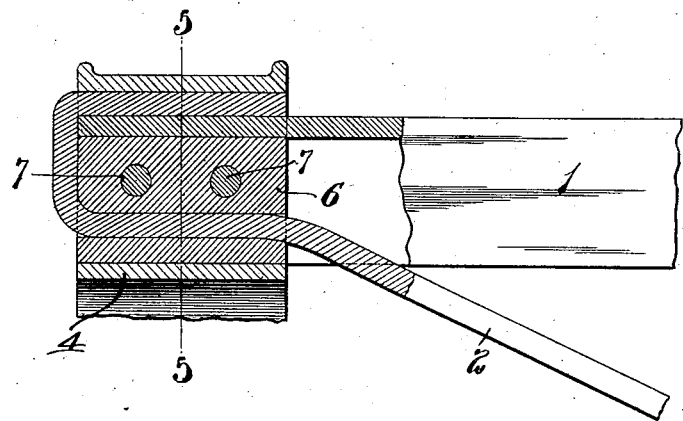
Figure 5:
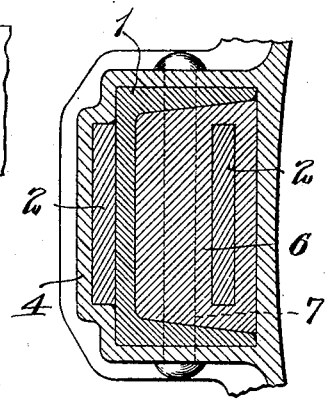
Figure 6:
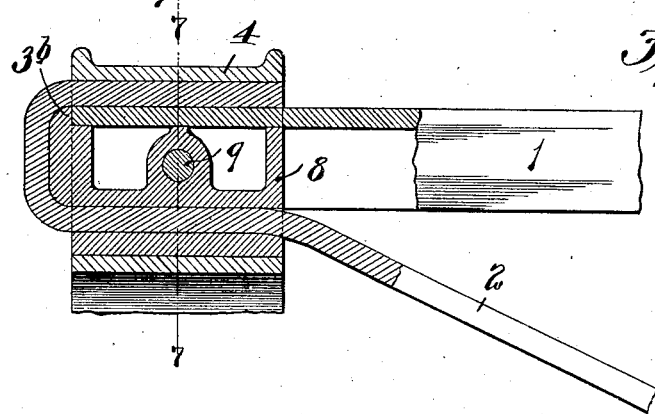
Figure 7:
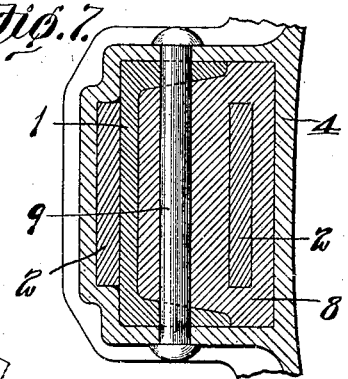
Figure 8:
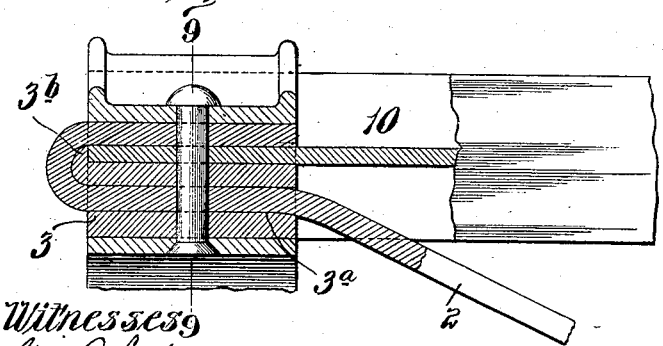
Figure 9:
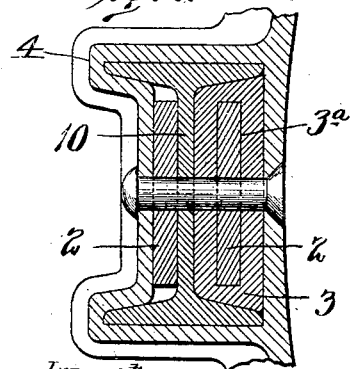

Figure 1 is a plan view, partly in section, of my improved trussed beam; Fig. 2 is a sectional view on the line 2—2 of Fig. 1; Fig. 3 is a detail view of the thrust block; Fig. 4 is a plan view, partly in section, of a modified form of beam; Fig. 5 is a sectional view on the line 5—5 of Fig. 4; Fig. 6 is a plan view, partly in section, of a modified form of beam; Fig. 7 is a sectional view on the line 7—7 of Fig. 6; Fig. 8 is a plan view, partly in section, of a modified form of beam; and Fig. 9 is a sectional view on the line 9—9 of Fig. 8.

This invention relates to a new and useful improvement in trussed beams, the object being to provide means for securing the bent end of the tension member in position in such manner that the brake head or spring seat casting, as the case may be, may be removed without disturbing the integrity of the truss. The trussed beam shown in the accompanying drawings is illustrated in the form of a brake beam, but it is obvious that the construction could be employed in connection with body bolsters and truck bolsters.

In the drawings, referring to Figs. 1, 2 and 3, 1 indicates the compression member in the form of a channel and 2 the tension member in the form of a flat plate.

3 is the thrust block having an opening 3ª formed therein, and having a lip or extension 3ᵇ fitting over the end of the compression member and forming a seat for said compression member to take up the end thrust thereof. In assembling the parts the end of the tension member is passed through the opening 3ª, the end of the tension member then being bent around the lip 3ᵇ and against the rear face of the compression member.

4 indicates the socket wall of the brake head, which brake head after being placed in position clamps the end of the tension member in place, and tends to secure the parts of the beam firmly together. A rivet 5 is employed to hold the brake head in position. By removing this rivet it is obvious that the brake head may be removed, but the removal of the brake head will not in any way disturb the integrity of the truss. It will of course be understood that in service the brake head or spring seat casting, as the case may be, is in position.

In Fig. 4 I show a modified construction in which the thrust block 6 is not provided with a lip 3ᵇ, the compression member exerting its thrust directly upon the bent end of the tension member. The securing rivets 7 for the brake head or spring seat casting in Fig. 4 are also arranged at right angles to the rivet 5 shown in Fig. 1.

In Figs. 6 and 7 the thrust block 8 is provided with a lip similar to the lip 3ᵇ, but in this instance the thrust block is made hollow and a single rivet 9 is employed, said rivet being arranged similar to the rivet 7 in Fig. 4.

In Figs. 8 and 9, the compression member 10 is in the form of an I-beam, and the thrust block is similar to the thrust block illustrated in Fig. 3. The socket wall of the brake head or spring seat casting, as the case may be, are made to conform to the rearwardly extending flanges of the I-beam.

I am aware that minor changes in the construction arrangement and combination of the several parts of my device can be made and substituted for those herein shown and described without in the least departing from the nature and principle of my invention.

Having thus described the invention, what is claimed as new and desired to be secured by Letters Patent is:

1. In a trussed beam, the combination with a straight compression member, a tension member, and a block provided with an opening extending parallel to the compression member and through which said tension member passes, the end of the tension member being bent around the end of the compression member; substantially as described.

2. In a trussed beam, the combination with a compression member, of a tension member, a block provided with an opening through which said tension member passes, said block also having a lip or shoulder extending laterally beyond the end thereof and projecting over the end of the compression member, the tension member being bent around said lip and against the compression member; substantially as described.

3. In a trussed beam, the combination with a compression member, a tension member, a block having an opening therein extending parallel to the compression member and through which opening said tension member passes, the end of the tension member being bent around the end of the compression member; substantially as described.

4. In a trussed beam, the combination with a compression member, a tension member, a block formed with an opening therein through which the tension member passes, said tension member being bent around the end of the compression member, and a member provided with a socket which fits over the end of the tension member and holds same in position; substantially as described.

5. In a trussed beam, the combination with a compression member, a tension member, a block formed with an opening for the tension member, which tension member is bent around the end of the compression member, a casting which embraces the end of the tension member, and a fastening means for holding said casting in position; substantially as described.

6. A thrust block adapted to be arranged in engagement with the compression member of a trussed beam and provided with an opening for receiving the tension member of said beam, and a lip projecting laterally beyond the outer end of said block so as to extend over the end of said compression member; substantially as described.

In testimony whereof I hereunto affix my signature in the presence of two witnesses, this 17th day of October, 1907.

CHARLES H. WILLIAMS, Jr.

Witnesses:
   E. S. WALKER,
   E. B. LEIGH.